Jan. 26, 1965  C. A. CALVIN  3,167,182
GUN RACK AND METHOD OF MANUFACTURE THEREOF
Filed March 14, 1963
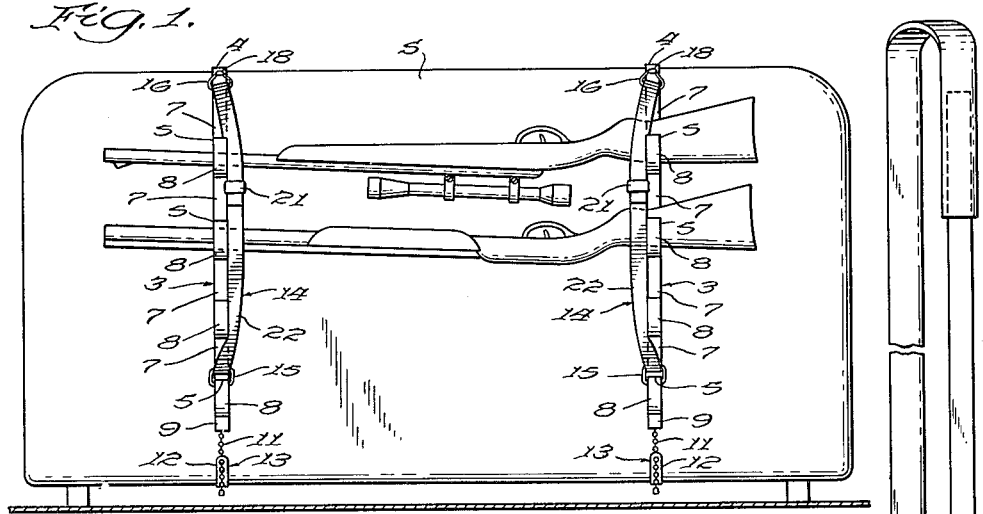
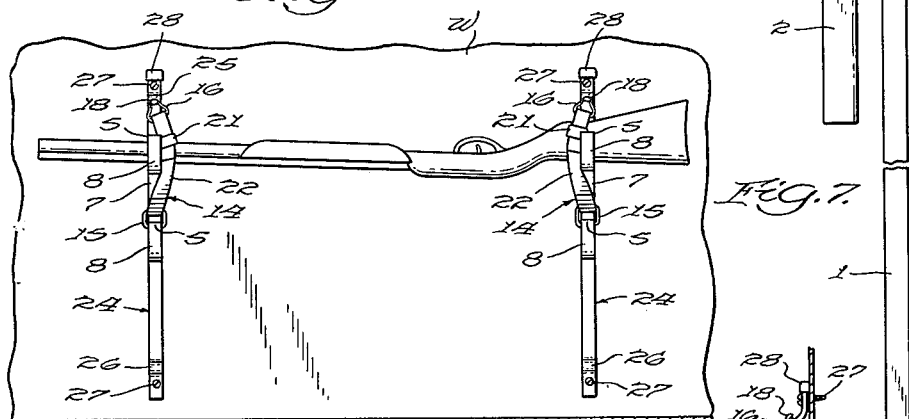
Inventor:
Charles A. Calvin,
By
Harold J. LeConte
Atty.

United States Patent Office 3,167,182
Patented Jan. 26, 1965

3,167,182
GUN RACK AND METHOD OF MANUFACTURE
THEREOF
Charles A. Calvin, 9919 Provo Ave., Tujunga, Calif.
Filed Mar. 14, 1963, Ser. No. 265,147
5 Claims. (Cl. 211—64)

This invention relates to racks, and more particularly to a gun rack means especially adapted for motor vehicles and in motor vehicle transported living quarters such as trailers and the so-called "campers."

The principal object of the invention is to provide a carrying rack means for shotguns and rifles being transported by motor vehicles and which rack means is characterized by simplicity of construction and by affording protection against scratching or other damage to the surface of the weapons.

Another object of the invention is to provide a gun rack means which is detachably mountable on the back of the front seat of a motor vehicle.

A further object of the invention is to provide a gun rack means adapted to be mounted on a wall surface such as the wall of a trailer, a station wagon or a camper.

Still another object of the invention is to provide a method of manufacture of a gun rack element comprising a metal bar or rod bent into a configuration affording gun engaging and supporting portions and having a plastic or other coating which is incapable of scratching or otherwise marring the surface of a gun supported thereby.

With the foregoing objects in view, together with such additional objects and advantages as may subsequently appear, the invention resides in the parts and in the construction, combination and arrangement of parts described, by way of example, in the following specification of certain presently preferred embodiments of the invention, reference being had to the accompanying drawings which form a part of said specification and in which drawings:

FIG. 1 is a side elevational view of a first embodiment of the invention which is adapted to be detachably mounted on the back of the front seat of a motor vehicle, FIG. 2 is an edge elevational view of one of the rack components as viewed from the right hand side of FIG. 1, FIG. 3 is an enlarged scale, fragmentary view, partly in section, showing the adjustable securing means at the lower end of the gun rack components shown in the preceding figures, FIG. 4 is a perspective, fragmentary, enlarged scale view of a portion of the upper end of the rack components shown in the preceding figures and particularly showing the attachment means for the retaining strap component of the device, FIG. 5 is a side elevational view of a second embodiment of the invention comprising a pair of gun supporting rack components mounted on a wall surface which may, for example, be a wall surface of a station wagon or other vehicle equipment such as previously mentioned, FIG. 6 is an edge elevational view of one of the components of a second embodiment of the invention as viewed from the right hand side of FIG. 5, and FIG. 7 is a perspective view showing the start of the initial step in the method of assembly of the rack forming component; portions being broken out to permit showing on a scale sufficiently large to disclose details.

Referring first to FIG. 7, each rack component is formed from a generally rectangular metal bar 1 of greater width than thickness which is first inserted into a corresponding length of flexible plastic or equivalent tubing 2 having a cross-sectional configuration and size to permit ready insertion of the bar therein with only sufficient clearance for the said ready insertion. The thus combined bar and tubing is then bent into the configuration desired as shown in the other figures and the bends thus formed are sufficient to retain the tubing from dislodgment from the bars contained therein. The tubing affords a surface which is sufficiently soft to prevent marring of the surface of the stocks or the barrels of guns mounted therein for carrying.

The first embodiment of the invention is shown in FIGS. 1–4 and is adapted for mounting on the back surface of the front seat or an equivalent back of the seat of a motor vehicle. In forming this embodiment of gun rack, the assembled tubing and metal bars forming the rack members 3, 3 are similarly bent into a hooked upper end 4 adapted to extend over the upper end of a vehicle seat back S and thence extend downwardly in spaced parallel relation. At spaced intervals along their lengths, the combined tubing and bars are doubled into close return bends 5 and the side-by-side portions extending from the bends 5 are thence turned or curved outwardly and thence upwardly to form gun stock or barrel receiving hooked portions comprising an upper run 6 on which the gun rests and which thence extends upwardly in a run 7 either to the seat engaging hook portion 4 or into the lower run 8 which extends parallel to the run 6 from the return bend 5 of the gun supporting hook immediately above. Below the lowermost hook portion, the combined bar and tubing terminates in a short end portion 9 and fixed to this end portion is a retaining clip 10 for one end of a length of ball chain 11, the other end of which extends through a keyhole shaped slot 11' in the shank 12 of a sheet metal hook 13 adapted to hook under the rear frame structure of the vehicle seat as best shown in FIG. 2. It will be noted that the bar components 1 are resilient and that the portions thereof forming the runs 6 and 8 extending from the bends 5 may be spread apart as shown in FIG. 2, to afford the required elasticity to permit the self-sustaining attachment of the components to the vehicle seat by their resilience. These components are used in pairs and are spaced from each other with sufficient distance to properly support the guns and while four sets of gun supporting hooks are shown, it will be appreciated that fewer or more may be provided as the vertical space will allow. The spreading of the runs forming the hooks imparts a resilient quality to them so that under the weight of a gun thereon, they will yield appreciably as the vehicle traverses rough spots in the terrain traversed for added protection of the guns.

To retain the guns within the hooks of each rack component, means comprising a resilient, flexible strap 14 is provided. The strap has a lower end fixed to a rectangular ring 15 inserted in the lowermost return bend 5 and thence extends through the horizontal bar of a second ring 16 which is of triangular configuration and arranged to have the apical portion thereof detachably engage the shoulder portion 17 of a shoulder rivet 18 having a head 19 and a shank 20 extending through the bar and plastic coating above the uppermost gun-carrying hook. The strap thence extends downwardly to a friction-grip buckle means 21 which is adjustable along the bight 22 of the strap which extends between the rings 15 and 16 to effect the desired tightness of the strap. The strap when secured and stretched between the rings 15 and 16, lies alongside of the hooks on which the guns rest. The upper ends of the hook portions 4 may be provided with a plastic cap 23 to cover the end of the metal bar. This form of the invention may obviously be quickly installed and removed from the vehicle and when installed, affords a safe and efficient mode of carrying guns and a means which at the same time will protect them from damage.

The second embodiment of the invention is shown in FIGS. 5 and 6 and is intended for permanent installation on a wall surface and, as previously mentioned, this wall surface may be that of a vehicle or a vehicle transported means such as a trailer or camper. The rack elements 24 are formed from plastic covered metal bars of the same type as previously described and the gun-carrying hook portions are of the same configuration, wherefore, they have been given the same numbers as in the first described embodiment. The number of such hooks may be either lesser or greater than the two hooks shown according to the needs and the vertical wall space available. In the illustrated embodiment, the hooks are outwardly offset from the wall W by upper and lower offset bends 25 and 26 and the upper and lower ends are secured to the wall by screws 27. Preferably, at least the upper ends are covered by plastic cap elements 28.

The same type of strap retaining elements are employed and consequently such elements are shown using the same numbers as employed in the first embodiment of the invention.

Thus there has been provided an economical, sturdy and practical gun rack means as well as an economical and novel method for producing the same. While in the foregoing specification there has been disclosed certain presently preferred embodiments of the invention, it will be understood that such disclosure has been by way of example and that the invention includes as well all such changes and modifications in the parts, and in the construction, combination and arrangement of parts as shall come within the purview of the appended claims.

I claim:

1. A gun rack means comprising a pair of identical, vertically disposed, elongated components mounted in laterally spaced, parallel relation; each of said components comprising a metal bar having longitudinally spaced portions thereof bent into closely doubled relation and said doubled portions being bent laterally outwardly and upwardly both to form gun receiving and supporting hooks and to impart capacity for longitudinal resilience to the components; means at the ends of said components in resiliently extended condition for mounting said components on a generally vertically extending surface, and gun retaining means comprising a pair of flexible straps associated one each with each of said components and having one end portion fixed to a lower portion of the component with which it is associated and having another portion detachably engageable with means carried by the associated component and disposed above said hook forming portions thereof.

2. A gun rack means as claimed in claim 1 in which said mounting means for said components comprises means at the opposite ends thereof affording detachable engagement with the upper and lower edges of the back of a seat of a motor vehicle.

3. A gun rack means as claimed in claim 1 in which said components are provided with means for mounting them on a vertical wall surface.

4. A gun rack means as claimed in claim 1 in which said metal bars constituting said rack components are covered by a flexible plastic tubing partaking of all of the bends of said bars with resultant provision of exterior surfaces on said rack components which are incapable of marring the surface of a gun supported thereon.

5. The method of forming a gun rack means which comprises providing a length of resilient metal bar and a corresponding length of flexible plastic tubing into which the bar may be received with a minimum of circumferential slackness, inserting the bar into the tubing, and bending the combined bar and tubing into a configuration forming a plurality of gun supporting hook portions, the bending of the combined bar and tubing including closely doubled portions effective to prevent the removal of the tubing from the bar; said hook portions further imparting longitudinal resilience to the bars and said plastic tubing accommodating movements deriving from said longitudinal resilience of said bars.

References Cited in the file of this patent

UNITED STATES PATENTS

| | | |
|---|---|---|
| 1,429,835 | Beiner | Sept. 19, 1922 |
| 2,114,424 | Jesse et al. | Apr. 19, 1938 |
| 2,535,564 | Campbell | Dec. 26, 1950 |
| 2,797,033 | Rasbach | June 25, 1957 |
| 2,823,808 | Hindi | Feb. 18, 1958 |
| 2,828,097 | Faunce | Mar. 25, 1958 |

FOREIGN PATENTS

| | | |
|---|---|---|
| 540,580 | Germany | Dec. 23, 1931 |